United States Patent
Vannithamby et al.

(10) Patent No.: US 9,225,759 B2
(45) Date of Patent: Dec. 29, 2015

(54) USER EQUIPMENT AND METHOD FOR DISCONTINUOUS RECEPTION (DRX) MODE IN WIRELESS COMMUNICATION NETWORKS

(71) Applicants: Rath Vannithamby, Portland, OR (US); Ali Taha Koc, Hillsboro, OR (US)

(72) Inventors: Rath Vannithamby, Portland, OR (US); Ali Taha Koc, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 13/626,409

(22) Filed: Sep. 25, 2012

(65) Prior Publication Data

US 2013/0194991 A1 Aug. 1, 2013

Related U.S. Application Data

(60) Provisional application No. 61/591,641, filed on Jan. 27, 2012.

(51) Int. Cl.
 H04W 52/02 (2009.01)
 H04W 72/04 (2009.01)
 H04W 28/12 (2009.01)
 (Continued)

(52) U.S. Cl.
 CPC ............ *H04L 65/4076* (2013.01); *H04B 7/024* (2013.01); *H04B 7/0413* (2013.01); *H04B 7/0456* (2013.01); *H04B 7/0617* (2013.01); *H04B 7/0639* (2013.01); *H04L 1/1864* (2013.01); *H04L 1/1896* (2013.01); *H04L 5/0035* (2013.01); *H04L 5/0048* (2013.01); *H04L 5/1469* (2013.01); *H04L 12/189* (2013.01); *H04L 65/608* (2013.01); *H04W 4/005* (2013.01); *H04W 4/08* (2013.01);
 (Continued)

(58) Field of Classification Search
 USPC .................................................. 370/252, 311
 See application file for complete search history.

(56) References Cited

U.S. PATENT DOCUMENTS 8,953,509 B2 * 2/2015 Lee et al. ....................... 370/311
8,989,042 B2 * 3/2015 Chou et al. .................... 370/252
(Continued)

FOREIGN PATENT DOCUMENTS

CN 103999515 A 8/2014
JP 2006270296 A 10/2006
(Continued)

OTHER PUBLICATIONS

"International Application Serial No. PCT/US2012/044670, International Preliminary Report on Patentability mailed Jan. 16, 2014", 6 pgs.

(Continued)

*Primary Examiner* — Ahmed Elallam
(74) *Attorney, Agent, or Firm* — Schwegman Lundberg & Woessner, P.A.

(57) ABSTRACT

Embodiments of user equipment (UE) and method for discontinuous reception (DRX) mode in wireless communication are generally described herein. In some of these embodiments, the UE may operate to determine a value for a DRX parameter based at least in part on information associated with an application running on the UE. The UE may send a message to an enhanced node-B (eNB). The message may include at least one of the value for the DRX parameter and the information associated with the application. The eNB may determine values for DRX parameters that the UE may use in DRX mode.

16 Claims, 3 Drawing Sheets

(51) Int. Cl.
  H04L 29/06    (2006.01)
  H04W 72/08    (2009.01)
  H04B 7/02     (2006.01)
  H04B 7/04     (2006.01)
  H04B 7/06     (2006.01)
  H04W 4/00     (2009.01)
  H04W 4/08     (2009.01)
  H04L 12/18    (2006.01)
  H04L 1/18     (2006.01)
  H04L 5/14     (2006.01)
  H04L 5/00     (2006.01)

(52) U.S. Cl.
  CPC ........... *H04W 72/04* (2013.01); *H04W 72/042* (2013.01); *H04W 72/085* (2013.01); *H04L 5/0053* (2013.01)

(56) References Cited

U.S. PATENT DOCUMENTS

| | | | |
|---|---|---|---|
| 2007/0287468 A1 | 12/2007 | Jeong et al. | |
| 2007/0291673 A1* | 12/2007 | Demirhan et al. | 370/311 |
| 2008/0181127 A1 | 7/2008 | Terry et al. | |
| 2008/0232310 A1* | 9/2008 | Xu | 370/329 |
| 2009/0238098 A1 | 9/2009 | Cai et al. | |
| 2010/0255835 A1* | 10/2010 | Suzuki et al. | 455/425 |
| 2011/0136530 A1 | 6/2011 | Deshpande | |
| 2011/0199951 A1 | 8/2011 | Kwon et al. | |
| 2011/0243047 A1* | 10/2011 | Dayal et al. | 370/311 |
| 2012/0033597 A1* | 2/2012 | Kim et al. | 370/311 |
| 2012/0106424 A1* | 5/2012 | Davies et al. | 370/311 |
| 2012/0115552 A1* | 5/2012 | Bhattacharya | 455/574 |
| 2012/0120828 A1* | 5/2012 | Anderson et al. | 370/252 |
| 2012/0120843 A1* | 5/2012 | Anderson et al. | 370/253 |
| 2012/0236834 A1* | 9/2012 | Ho et al. | 370/337 |
| 2012/0320811 A1* | 12/2012 | Islam et al. | 370/311 |
| 2013/0083713 A1* | 4/2013 | Johansson et al. | 370/311 |
| 2013/0107727 A1* | 5/2013 | Lunden et al. | 370/252 |
| 2013/0155928 A1* | 6/2013 | Yu et al. | 370/311 |
| 2014/0112221 A1* | 4/2014 | Verger et al. | 370/311 |
| 2014/0119255 A1* | 5/2014 | Vannithamby et al. | 370/311 |
| 2014/0226542 A1 | 8/2014 | Gupta et al. | |

FOREIGN PATENT DOCUMENTS

| | | |
|---|---|---|
| JP | 2010508704 A | 3/2010 |
| JP | 2010526495 A | 7/2010 |
| JP | 2010538506 A | 12/2010 |
| WO | WO-2007082934 A1 | 7/2007 |
| WO | WO-2010054391 A2 | 5/2010 |
| WO | WO-2013006381 A3 | 5/2013 |
| WO | WO-2013112733 A1 | 8/2013 |

OTHER PUBLICATIONS

"International Application Serial No. PCT/US2012/044670, International Search Report mailed Jan. 29, 2013", 3 pgs.

"International Application Serial No. PCT/US2012/044670, Written Opinion mailed Jan. 29, 2013", 4 pgs.

"International Application Serial No. PCT/US2013/022985, International Search Report mailed Apr. 1, 2013", 3 pgs.

"International Application Serial No. PCT/US2013/022985, Written Opinion mailed Apr. 1, 2013", 5 pgs.

"Analysis on sending the MTC Indicator to the network in Release 10", Nokia Siemens Networks, Nokia, 3GPP TSG SA WG2 Meeting #82 TD S2-105744, TD C1-104835, (Nov. 9, 2010), 6 pgs.

"Australian Application Serial No. 2013212110, First Examiners Report mailed Feb. 10, 2015", 6 pgs.

"European Application Serial No. 12807773.2, Extended European Search Report mailed Feb. 17, 2015", 6 pgs.

"International Application Serial No. PCT/US2013/022985, International Preliminary Report on Patentability mailed Aug. 7, 2014", 7 pgs.

"Japanese Application Serial No. 2014-519030, Office Action mailed Jan. 27, 2015", w/ English Translation, 9 pgs.

Bontu, C, et al., "DRX mechanism for power saving in LTE", IEEE Communications Magazine, IEEE Service Center, Piscataway, US, vol. 47, No. 6, (Jun. 1, 2009), 48-55.

"Australian Application Serial No. 2013212110, Response filed Jul. 16, 2015 to First Examiner's Report mailed Feb. 10, 2015", 25 pgs.

"Japanese Application Serial No. 2014-553550, Office Action mailed Jun. 30, 2015", W/ English Translation, 6 pgs.

"Korean Application Serial No. 10-2014-7020673, Office Action mailed Jun. 17, 2015", W/ English Translation, 10 pgs.

Intel Corporation, "LTE Fast Dormancy", 3GGP TSG-RAN WG2 Meeting #72 R2-106825, [Online] retrieved from the internet: <http://www.3gpp.org/ftp/tsg_ran/WG2_RL2/TSGR2_72/Docs/R2-106285.zip>, (Nov. 10, 2010).

Nokia, "DRX parameter negotiation in PDP Context activation/modification/deactivation", 3GPP TSG-SA WG2#30 S2-030543, [Online] retrieved from the internet: 1 <http://www.3gpp.org/ftp/tsg_sa/WG2_Arch/TSGS2_30_Milan/tdocs/S2-030543.zip>, (Mar. 2, 2003).

* cited by examiner

USER EQUIPMENT AND METHOD FOR DISCONTINUOUS RECEPTION (DRX) MODE IN WIRELESS COMMUNICATION NETWORKS

PRIORITY APPLICATION

This patent application claims the benefit of priority, under 35 U.S.C. Section 119(e), to U.S. Provisional Patent Application Ser. No. 61/591,641 filed on Jan. 27, 2012, which is hereby incorporated by reference herein in its entirety.

TECHNICAL FIELD

Embodiments pertain to wireless communications. Some embodiments relate to discontinuous reception (DRX) in wireless networks including those networks that operate in accordance to a 3GPP Evolved Universal Terrestrial Radio Access Network (E-UTRAN) Long-Term-Evolution (LTE-A) advanced network standard.

BACKGROUND

Power savings is an issue in mobile and portable wireless communication devices, such as user equipment (UE), because most of these devices usually use a battery that has a limited energy storage capacity. In some conventional wireless communication networks, the mobile device may enter a discontinuous reception (DRX) mode to save power when it does not actively communicate with other devices or with other entities in the network.

In the DRX mode, the mobile device may operate under some DRX parameters. Conventionally, the values for DRX parameters to be used by a mobile device in the DRX mode are determined by another entity in the network. Such an entity may include a base station, such as an enhanced node-B (eNB) in some 3GPP-LTE networks.

In some conventional techniques, the base station may determine the values for DRX parameters without some knowledge about the mobile device, such as requirements of applications running on the mobile device and other information. Thus, power savings involving DRX mode using some conventional techniques may be inefficient.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
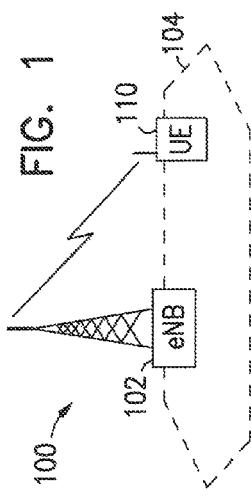
FIG. 1 shows a wireless communication network including enhanced Node-B (eNB) and user equipment (UE), according to some embodiments described herein.

FIG. 1 shows a wireless communication network 100, according to an embodiment of the invention. Wireless communication network 100 may include a base station, such as an evolved or enhanced Node-B (eNB) 102, and a mobile station, such as user equipment (UE) 110. The eNB 102 and user equipment 110 may operate to wirelessly communicate with each other in wireless communication network 100.

An example of wireless communication network 100 includes an evolved universal terrestrial radio access network (EUTRAN) using the 3rd Generation Partnership Project (3GPP) long term evolution (LTE) standard operating in time division duplex (TDD) mode. Another example of wireless communication network 100 includes a EUTRAN using the 3GPP-LTE standard operating in frequency division duplex (FDD) mode. Additional examples of wireless communication network 100 include Worldwide Interoperability for Microwave Access (WiMax) networks, 3rd generation (3G) networks, Wi-Fi networks, and other wireless data communication networks.

Examples of UE 110 include cellular telephones, smart phones, tablets, e-readers (e.g., e-book readers), laptops, desktops, personal computers, servers, personal digital assistants (PDAs), web appliances, set-top boxes (STBs), network routers, network switches, and network bridges. User equipment 110 may include other types of devices or equipment.

The eNB 102 may operate as a serving eNB in geographic area, such as cell 104, in wireless communication network 100. FIG. 1 shows wireless communication network 100 including only one eNB (e.g., the eNB 102) as an example. Wireless communication network 100, however, may include multiple eNBs (e.g., multiple eNBs similar to or identical to the eNB 102). Each of the multiple eNBs may serve a particular cell in wireless communication network 100 and may or may not neighbor the eNB 102.

User equipment 110 may be served by the eNB 102 in cell 104. FIG. 1 shows wireless communication network 100 including only one user equipment (e.g., UE 110) served by the eNB 102 in cell 104 as an example. Wireless communication network 100, however, may include multiple user equipments (UEs) served by the eNB 102. The multiple UEs may be similar to or identical to UE 110. UE 110 and the eNB 102 may operate to communicate with each other using an orthogonal frequency division multiple access (OFDMA) technique.

UE 110 may operate to receive OFDMA communication signals over a multicarrier communication channel in accordance with an OFDMA technique. The OFDMA technique may be either a frequency domain duplexing (FDD) technique that uses different uplink and downlink spectrum or a time domain duplexing (TDD) technique that uses the same spectrum for uplink and downlink. The OFDMA communication signals may comprise a plurality of orthogonal subcarriers.

UE 110 may operate in different operational states. In one or more of these operating states, UE 110 may enter a power saving mode to save power. For example, UE 110 may enter a power saving mode after a specific amount of time of no active communication (e.g., no exchanging of data) between UE 110 and the eNB 102. An example of a power saving mode in UE 110 includes a discontinuous reception (DRX) mode, such as DRX mode in accordance to the 3GPP-LTE standards.

Figure 2:
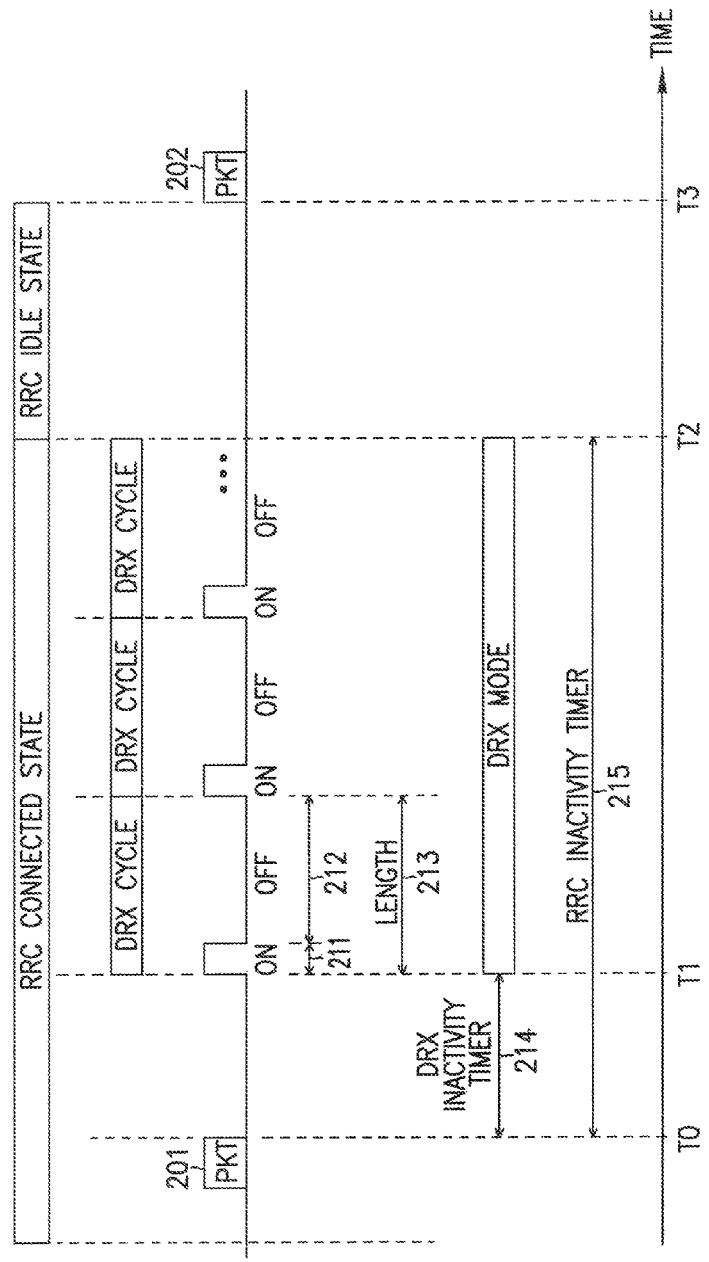
FIG. 2 is a timing diagram for some operational states and a discontinuous reception (DRX) mode of UE of FIG. 1, according to some embodiments described herein.

FIG. 2 is a timing diagram for some operational states and DRX mode of UE 110 of FIG. 1, according to some embodiments described herein. As shown in FIG. 2, UE 110 may operate in different states, such as radio resource control (RRC) connected state and RRC idle state. RRC connected state and RRC idle state in FIG. 2 may correspond to RRC_CONNECTED state and RRC_IDLE state, respectively, in accordance to the 3GPP-LTE standards.

UE 110 may enter DRX mode in RRC connected state and in RRC idle state to save power. FIG. 2 shows DRX mode in RRC connected state as an example. UE 110 may also enter DRX mode in RRC idle state. Packet (PKT) 201 and packet 202 in FIG. 2 may represent data packets (or other information) communicated between UE 110 and the eNB 102. Packet 201 may represent the last packet communicated (e.g., at time T0) between UE 110 and the eNB 102. Packet 202 may represent the next packet (e.g., packet after packet 201) communicated (e.g., at time T3) between UE 110 and the eNB 102.

As shown in FIG. 2, UE 110 may enter DRX mode at time T1 if no information is communicated between UE 110 and the eNB since time T0. Time T0 may correspond to a time at which the last information (e.g., packet 201) has been communicated between UE 110 and the eNB 102. The amount of time between times T0 and T1 may be based on the value for DRX parameter such as DRX inactivity timer 214. The eNB 102 may determine (e.g., set) the value for DRX inactivity timer 214 based at least on information provided to the eNB 102 by UE 110, as described in more detail below with reference to FIG. 3 and FIG. 4.

In wireless communication network 100 (FIG. 1), UE 110 may monitor (e.g., continuously monitor) control signals on certain channels to communicate with the eNB 102. UE 110 may save power by entering DRX mode and monitoring such control signals less frequently in DRX mode. For example, if UE 110 and the eNB 102 are arranged to communicate with each other in accordance to the 3GPP-LTE standards, UE 110 may monitor physical downlink control channel (PDCCH) in order to process (e.g., send and receive) actual data (e.g., packets 201 and 202 in FIG. 2). In this example, UE 110 may save power by monitoring the control signals on PDCCH less frequently in DRX mode.

As shown in FIG. 2, DRX mode may include at least one DRX cycle. Each DRX cycle may include DRX parameters, such as an on-duration 211, an off-duration 212, and DRX cycle length 213. The eNB 102 may determine (e.g., set) the value for on-duration 211, an off-duration 212, and DRX cycle length 213 based at least on information provided to the eNB 102 by UE 110, as described in more detail below with reference to FIG. 3 and FIG. 4.

In DRX mode in FIG. 2, UE 110 may remain asleep (e.g., most circuitry in UE 110 is turned off) during off-duration 212. UE 110 may wake up during on-duration 211 to monitor control information on a particular channel. For example, during on-duration 211, UE 110 may monitor frames of a control channel for uplink and downlink scheduling information or other information. During off-duration 212, the UE 110 may refrain from monitoring the control channel (e.g., does not monitor the control channel) in order to save power. During on-duration 211, packet activity for UE 110 may or may not occur. UE 110 may exit DRX mode if it detects packet activity during on-duration 211. UE 110 may stay in DRX mode if it does not detect packet activity during on-duration 211.

Each DRX cycle in FIG. 2 may correspond to a long DRX cycle in accordance to the 3GPP-LTE standards. Thus, as an example, during on-duration 211 in FIG. 2, UE 110 may monitor OFDMA frames of PDCCH in accordance to the 3GPP-LTE standards. During off-duration 212, the UE 110 may refrain from monitoring (e.g., does not monitor) OFDMA frames of PDCCH.

UE 110 may enter RRC idle state at time T2 if no information is communicated between UE 110 and the eNB 102 since time T0. The amount of time between times T0 and T2 may be based on the value for DRX parameter such as RRC inactivity timer 215. The eNB 102 may determine (e.g., set) the value for RRC inactivity timer 215 based at least on information provided to the eNB 102 by UE 110, as described in more detail below with reference to FIG. 3 and FIG. 4.

RRC idle state may also include at least one DRX cycle, which may be similar to or identical to DRX cycle in RRC connected state. During RRC idle state, UE 110 may remain asleep during a portion of each DRX cycle (e.g., off-duration) and wake up during another portion of the DRX cycle (e.g., off-duration) to monitor control information on the control channel (e.g., PDCCH). During RRC idle state (FIG. 2), packet activity for UE 110 may or may not occur. UE 110 may stay in RRC idle state if it does not detect packet activity during RRC idle state (between times T2 and T3). UE 110 may exit RRC idle state if it detects packet activity during RRC idle state. For example, as shown in FIG. 2, if UE 110 detects packet activity during RRC idle state, UE 110 may exit RRC idle state and re-enter RRC connected state (e.g., at time T3) to process packet 202.

UE 110 may save power in both DRX mode in RRC connected state and in RRC idle state. In RRC idle state, UE 110 and the eNB 102 may operate such that the network (e.g., network 100) may not continuously be aware of the presence of UE 110. For example, in RRC idle state, context of UE 110 may be removed from eNB 102. Thus, UE 110 may save more power in RRC idle state than in DRX mode in RRC connected state. However, if UE 110 detects control signals on control channel (e.g., PDCCH) while it is in RRC idle state, it may take more time (e.g., more delay) for UE 110 to re-enter the network from RRC idle state, in comparison with the time it takes UE 110 to re-enter the network from DRX mode in RRC connected state.

The amount of power savings in DRX mode may largely depend on the values for on-duration 211, an off-duration 212, and DRX cycle length 213. For example, a longer DRX cycle for a given (e.g., predefined) on-duration 211 may improve power savings in UE 110. However, a longer DRX cycle may increase delay due to buffering packets during off duration (such as delay in processing data packets associated with an application on UE 110) if control signals are present on the control channel. Thus, as described below with reference to FIG. 3 and FIG. 4, UE 110 and the eNB 102 may communicate with each other to provide a balanced trade-off between power consumption in UE 110 and application requirements.

Figure 3:
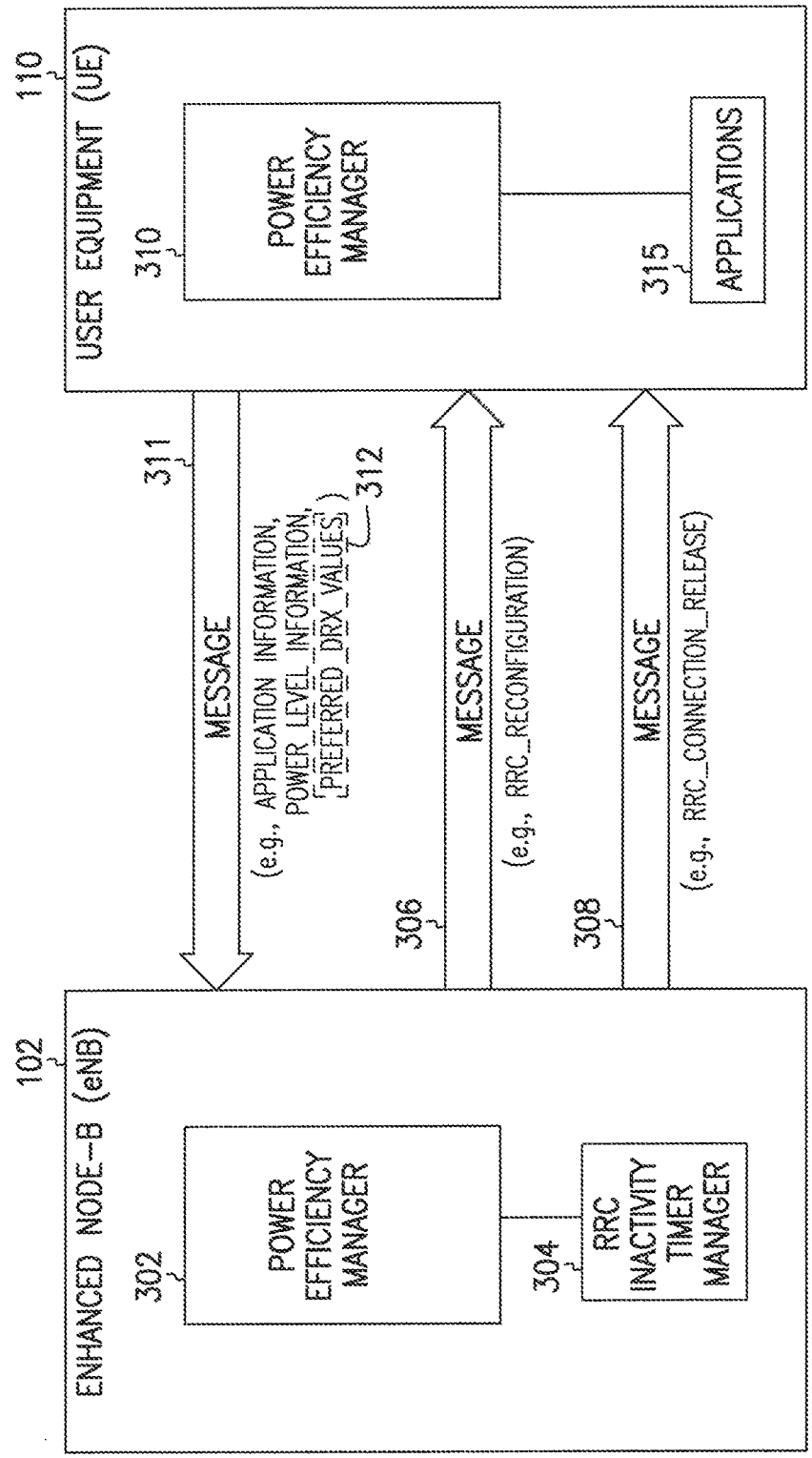
FIG. 3 shows an example communication between UE and eNB of FIG. 1, according to some embodiments described herein.

FIG. 3 shows an example communication between user equipment 110 and the eNB 102, according to some embodiments described herein. The communication shown in FIG. 3 may include messages (e.g., in the form of radio frequency (RF) signals), such as messages 306, 308, and 311.

As shown in FIG. 3, UE 110 may include applications 315. Examples of applications 315 include Facebook, Google chat, Microsoft Communicator, Skype, social networking websites, web-based chats, web-based news feeds, and the like. One or more of applications 315 may be running on UE 110 at a time. Some of applications 315 running on UE 110 may generate background traffic packets (e.g., random or periodic short bursts of packets) even when a user is not actively using these applications. Thus, without techniques described herein, UE 110 may keep connecting (e.g., entering RRC connected state, shown in FIG. 2) and disconnecting (e.g., exiting RRC connected state and entering RRC idle state) from the network more frequently to process packets (e.g., background traffic packets mentioned above). These frequent state changes (e.g., connecting and disconnecting from the network) may cause continuous battery power consumption in UE 110 and may introduce additional air-interface signaling overhead.

In techniques described herein (as described in more detailed below), the eNB 102 and UE 110 may communicate with each other (e.g., through messages 306, 308, and 311) to determine suitable values for DRX parameters to avoid (or reduce) such frequent state changes. This may allow UE 110 to stay in RRC connected state (e.g., in DRX mode) as long as possible and may still achieve at least the same level of power saving as in RRC idle state without entering RRC idle state. The eNB 102 and UE 110 may also communicate with each other to determine suitable values for DRX parameters in order to provide a balanced trade-off between power consumption in UE 110 and application requirements (e.g., delay requirements such as traffic pattern of packets associated with the application 315).

For example, the eNB 102 may determine the values for DRX parameters (e.g., values for on-duration 211, off-duration 212, and DRX cycle length 213, DRX inactivity timer 214, and RRC inactivity timer 215 in FIG. 2) based on information provided by UE 110 and other information. The information provided by UE 110 may include application requirements (e.g., delay requirements such as traffic pattern of packets associated with the application 315), conditions of UE 110 (e.g., power level information of UE 110), and preferred values for DRX parameters determined by UE 110, and other requirements of UE 110. The eNB 102 may also use other information to determine the values for DRX parameters, such as operator power saving requirements for UEs, backbone signaling load and congestion information, battery consumption target for UEs, and mobility level of UEs.

As shown in FIG. 3, UE 110 may include a power efficiency manager 310 that may operate to check power level (e.g., battery level) of UE 110. Power efficiency manager 310 may also operate to gather information associated with an application (or applications) among applications 315 running on UE 110. Such information may include traffic pattern of packets (e.g., including background traffic packets) associated with the application. The information may also include delay tolerance in sending data, receiving data, or both, associated with the application. Different applications or different data types associated with a given application have different time sensitivity (or delay tolerance) for sending or receiving. Delay tolerance may also be identified based on the type of device of the UE 110. Thus, the information associated with an application (or applications) running on UE 110 may include traffic pattern of packets associated with the application and delay tolerance of the application, and other application requirements.

Power efficiency manager 310 may determine values (e.g., preferred values) for DRX parameters (e.g., preferred values for on-duration 211, off-duration 212, and DRX cycle length 213, DRX inactivity timer 214, and RRC inactivity timer 215 in FIG. 2) based on the information associated with an application (or applications) running on UE 110 and power level information of UE 110. For example, some of applications 315 may use messages (e.g., random or periodic short messages, such as keep-alive messages) to keep content up-to-date. UE 110 may use the known pattern of such messages (e.g., traffic pattern of packets associated with such messages) to determine suitable (e.g., best) values for DRX parameters. For example, if UE 110 knows that there will be keep-alive messages that will be transmitted to the eNB 102 at some periodicity, then UE 110 may determine that the value for RRC inactivity timer 215 (FIG. 2) for entering RRC Idle state should be greater than the periodicity of the keep-alive messages. Thus, based on pattern of messages (e.g., traffic pattern of packets) associated with an application, UE 110 may stay in RRC connected state (e.g., in DRX mode in RRC connected state) and refrain from entering (e.g., prematurely entering) RRC idle state in order to avoid (or reduce) frequent state changes. As described above, avoiding (or reducing) frequent state changes may improve (e.g., increase) power savings in UE 110.

As shown in FIG. 3, power efficiency manager 310 may generate a message 311 and send it to eNB 102. Message 311 may be sent to the eNB before UE 110 enters DRX mode. Message 311 may include information associated with an application (or applications) among application 315 running on UE 110. Message 311 may also include power level information of UE 110. Message 311 may further include values for DRX parameters (e.g., preferred values 312 for on-duration 211, off-duration 212, and DRX cycle length 213, DRX inactivity timer 214, and RRC inactivity timer 215) that UE 110 determines based on the information associated with the application running on UE 110 and power level information of UE 110. FIG. 3 shows an example where a single message (e.g., message 311) may be used to include information associated with an application (or applications) among application 315 running on UE 110, power level information, and preferred values 312 for DRX parameters. However, multiple messages may be used.

The eNB 102 may include a power efficiency manager 302 to determine values for DRX parameters that UE 110 may use in DRX mode. The values for DRX parameters determined by the eNB 102 may be based on information included in message 311 sent by UE 110. The values for DRX parameters determined by the eNB 102 may also be based on other information, such as operator power saving requirements for UEs, backbone signaling load and congestion information, battery consumption target for UEs, and mobility level of UEs.

As shown in FIG. 3, power efficiency manager 302 may generate a message 306 and send it to UE 110. Message 306 may include RRC_RECONFIGURATION message according to the 3GPP-LTE standards. Message 306 may include values for DRX parameters determined by eNB 102. UE 110 may use the values for DRX parameters included in message 306 to enter DRX mode and monitor the control channel at specific duration (e.g., on-duration) during each DRX cycle.

The eNB 102 may include RRC inactivity timer manager 304 to determine a value for RRC inactivity timer 215 (FIG. 2). FIG. 3 shows an example where RRC inactivity timer manager 304 and power efficiency manager 302 are separate functional elements. However, RRC inactivity timer manager 304 and power efficiency manager 302 may be combined in the same function element.

As shown in FIG. 3, RRC inactivity timer manager 304 may generate a message 308 and send it to UE 110. Message 308 may include RRC_CONNECTION_RELEASE message according to the 3GPP-LTE standards. Message 308 may be sent after the value for RRC inactivity timer 215 reaches the value determined by the eNB 102. UE 110 may enter RRC idle state (FIG. 2) after it receives message 308.

The value for RRC inactivity timer 215 may have a direct impact on the number of user equipments in RRC connected state and RRC Idle state. For example, keeping more user equipments in RRC connected state may increase the control channel utilization. Keeping more user equipments in RRC Idle state may increase the backbone signaling due to switching from RRC Idle state to RRC connected state. Thus, in order to determine a suitable (e.g., best) value for RRC inactivity timer 215, inactivity timer manager 304 may determine the value for RRC inactivity timer 215 based on information included in message 311 (sent by UE 110) and other information, such as operator power saving requirements for UEs, backbone signaling load and congestion information, battery consumption target for UEs, and mobility level of UEs.

Thus, as described above with reference to FIG. 3, UE 110 may send message 311 to the eNB 102 including information, such as information associated an application running on UE 110, power level information of UE 110, and preferred values 312 for DRX parameters (e.g., preferred values 312 for on-duration 211, off-duration 212, and DRX cycle length 213, DRX inactivity timer 214, and RRC inactivity timer 215). Based on the information included in message 311 and other information, the eNB 102 may determine values for DRX parameters for UE 110 to use in DRX mode. The values for DRX parameters (e.g., included in message 306) determined by the eNB 102 may be identical to the preferred values 312 for DRX parameters (e.g., included in message 311) determined by UE 110. However, depending on how the eNB 102 balances the trade-off between power saving requirements and application requirements, at least one of the values for DRX parameters (e.g., included in message 306) determined by eNB 102 may be different from the corresponding preferred value for DRX parameters determined (e.g., included in message 311) by UE 110. After UE 110 receives the DRX parameters having values determined by eNB 102, these values may remain fixed (e.g., static). However, at least one value among the values for DRX parameters may be changed to a new value.

For example, the eNB 102 may generate a new value for one or more of the DRX parameters (on-duration 211, off-duration 212, and DRX cycle length 213, DRX inactivity timer 214, and RRC inactivity timer 215), depending on information such as operator power saving requirements for UEs, backbone signaling load and congestion information, battery consumption target for UEs, and mobility level of UEs. At least one of the values (e.g., initial values) for the DRX parameters may be different from the new values. The eNB 102 may send a message (e.g., an additional message similar to or identical to message 306) to UE 110. The message may include information about new values for DRX parameters. The message may also include information to cause UE 110 to change the values (e.g., initial values) for the DRX parameters at UE 110 to the new values. Thus, in response to that message, UE 110 may change one or more of the values (e.g., initial values) for the DRX parameters to a new value.

The eNB 102 may generate a new value for one or more of the DRX parameters with or without receiving an explicit message requesting such a new value (or new values) from UE 110. For example, based on information included in message 311 (FIG. 3) sent by UE 110, the eNB 102 may provide UE 110 with initial values for DRX parameters. UE 110 may use the initial values for DRX parameters in an initial DRX mode. After the initial values have been provided to UE 110, the eNB 102 may generate new values for DRX parameters and provide UE 110 with the new values. The eNB 102 may generate the new values for DRX parameters with or without receiving a message (e.g., a message different from message 311) from UE 110. UE 110 may use DRX parameters having at least one new value in a subsequent DRX mode (e.g., DRX mode after the initial DRX mode).

The techniques described herein may improve power consumption in UE 110 and/or provide a balanced trade-off between power consumption in UE 110 and application requirements associated with the application running on UE 110. For example, the techniques described herein may improve (e.g., optimize) performance of some of these features (e.g., power consumption) in UE 110 while satisfying some other predetermined performance requirements of other features (e.g., application requirements). Moreover, the techniques described herein may provide a flexible approach in which one or more DRX parameters may be relaxed and one or more other DRX parameters may be adjusted.

Figure 4:
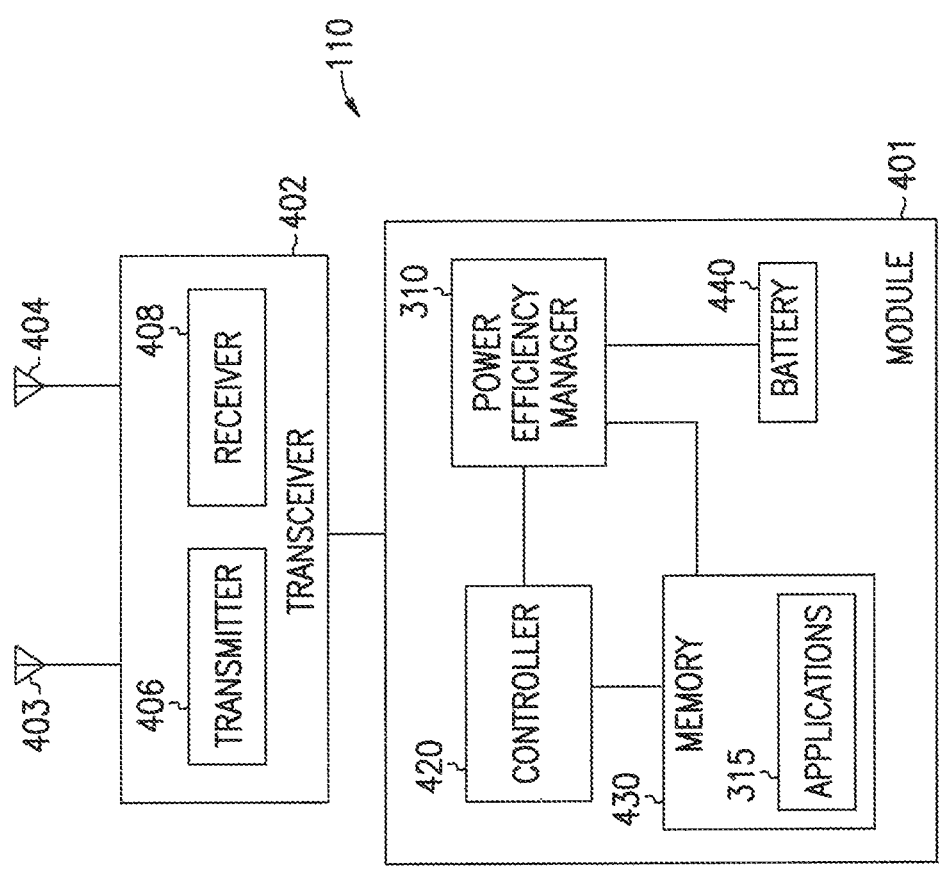
FIG. 4 shows an example block diagram of UE of FIG. 1 and FIG. 3, according to some embodiments described herein.

FIG. 4 shows an example block diagram of UE 110 of FIG. 1 and FIG. 3, according to some embodiments described herein. As shown in FIG. 4, UE 110 may include a module 401, a transceiver 402, and antennas 403 and 404. Transceiver 402 may include a transmitter 406 and a receiver 408. Module 401 may include power efficiency manager 310 (described above with reference to FIG. 3), a controller 420, a memory 430, and a battery 440. For simplicity, FIG. 4 omits other elements of UE 110, such as one or more of a keyboard, a display (e.g., an LCD screen including a touch screen), a non-volatile memory port (e.g., a Universal Serial Bus (USB) port), speakers, and other elements.

Module 401 and transceiver 402 may be arranged (e.g., configured) to perform operations described above with reference to FIG. 1 through FIG. 3. For example, module 401 may determine values (e.g., preferred values 312 in FIG. 3) for DRX parameters and send the values to eNB 102 (FIG. 3) in message 311 (FIG. 3). Module 401 may also cause UE 110 to enter DRX mode (e.g., DRX mode in RRC connected state in FIG. 2) using DRX parameters having values provided by the eNB 102 in message 306 (FIG. 3). After UE 110 enter DRX mode (e.g., DRX mode in RRC connected state in FIG. 2), module 401 may cause UE 110 to stay in DRX mode and refrain from entering RRC idle state for increased power savings. For example, module 401 may cause UE 110 to stay in DRX mode and refrain from entering RRC idle state based on information (traffic pattern of packets) associated with an application (or applications) among application 315 running on UE 110 to avoid (or reduce) frequent state changes in order to increase power savings. In DRX mode, module 401 may monitor OFDMA frames of PDCCH during the on-duration 211 (FIG. 2) and refrain from monitoring (e.g., does not monitor) OFDMA frames of PDCCH during off-duration 212 (FIG. 2).

Transmitter 406 may receive uplink receptions and transmit downlink transmissions between UE 110 and the eNB 102. For example, transmitter 406 may be arranged to send one or more message (e.g., through antenna 403), such as message 311 (FIG. 3) to eNB 102. Receiver 408 may be arranged to receive one or more message from eNB 102 (e.g., through antenna 404), such as messages 306 and 308 (FIG. 3).

Controller 420 of module 401 may include one or more central processing units (CPUs), graphics processing units (GPUs), or both. Controller 420 may be arranged (e.g., configured) to provide processing and control functionalities for UE 110. Memory 430 may include volatile memory, non-volatile memory, or a combination of both. Memory 430 may store instructions (e.g., firmware programs, software programs, or a combination of both). Some instructions stored in memory 430 may form at least part of applications 315. Controller 420 may execute instructions in memory 430 to result in UE 110 performing operations, such as operations in UE 110 described above with reference to FIG. 1 through FIG. 4.

Antennas 403 and 404 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. Antenna 403 and 404 may be arranged to support multiple-input and multiple-output (MIMO) communications. In some MIMO embodiments, antennas 403 and 404 may be effectively separated to take advantage of spatial diversity and the different channel characteristics that may result between each of antennas 403 and 404 and the antennas of a transmitting station. In some MIMO embodiments, the antennas 403 and 404 may be separated by up to 1/10 of a wavelength or more.

FIG. 4 shows an example where UE 110 includes one transceiver (e.g., 402) and two antennas (e.g., 403 and 404). The number of transceivers and antennas may vary. Module 401 and transceiver 402 may be arranged to operate in different communication networks, such as a 3GPP-LTE network, a WiMax network, and other networks.

Although UE 110 is shown as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 110 may be configured with the instructions to perform the operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User equipment (UE) comprising:
a module to
determine a value for a discontinuous reception (DRX) parameter based at least in part on information associated with an application when the application is running on the UE, the information including traffic pattern of packets associated with the application, the traffic pattern indicating whether the application generates background traffic packets and the information indicating delay requirements for the application, the DRX parameter including one of an on-duration of a DRX cycle, a DRX cycle length, an inactivity DRX timer, and radio resource control (RRC) inactivity timer; and
a transmitter to send a message to an enhanced node-B (eNB), the message including at least one of the value for the DRX parameter and the information associated with the application, wherein the module is arranged to cause the UE to enter a DRX mode using DRX parameters having values determined by the eNB, wherein at least one of the values is based at least in part on the information associated with the application, and the module is arranged to cause the UE to stay in the DRX mode and refrain from entering radio resource control (RRC) idle state based on the traffic pattern of packets associated with the application, and wherein a value for an RRC inactivity timer for entering RRC idle state is greater than a periodicity of keep-alive messages associated with the application.

2. The UE of claim 1, wherein the module is arranged to determine the value for the DRX parameter based further on power level information of the UE.

3. The UE of claim 1, wherein the message further includes power level information of the UE.

4. The UE of claim 1, wherein the module is further arranged to determine at least one additional value for at least one additional DRX parameter based at least in part on the information associated with the application, wherein the message further includes the at least one additional value.

5. The UE of claim 1, wherein the DRX mode includes a DRX cycle having a first duration and a second duration, the module arranged to monitor orthogonal frequency division multiple access (OFDMA) frames of a physical downlink control channel (PDCCH) during the first duration, and the module arranged to refrain from monitoring OFDMA frames of PDCCH during the second duration.

6. The UE of claim 1, wherein the module is arranged to cause the UE to enter a DRX mode using DRX parameters having values determined by the eNB, and one of the values is identical to the value for the DRX parameter determined by the module.

7. The UE of claim 1, wherein the module is arranged to cause the UE to enter a DRX mode using DRX parameters having values determined by the eNB, and one of the values is different from the value for the DRX parameter determined by the module.

8. An enhanced Node-B (eNB) comprising:
one or more processors arranged to:
generate a value for a discontinuous reception (DRX) parameter among DRX parameters based at least in part on information associated with an application when the application is running on user equipment (UE), the information including traffic pattern of packets associated with the application, the traffic pattern indicating whether the application generates background traffic packets and the information indicating delay requirements for the application, the DRX parameter including a radio resource control (RRC) inactivity timer; and
send the value for the DRX parameter to the UE, wherein the eNB is arranged to cause the UE to enter a DRX mode using DRX parameters having values determined by the eNB, wherein at least one of the values is based at least in part on the information associated with the application, wherein the eNB is arranged to cause the UE to stay in the DRX mode and refrain from entering radio resource control (RRC) idle state based on the traffic pattern of packets associated with the application, and wherein a value for an RRC inactivity timer for entering RRC idle state is greater than a periodicity of keep-alive messages associated with the application.

9. The eNB of claim 8, wherein the eNB is further arranged to generate the value based further on at least one of power level information of the UE and a preferred value determined by the UE for at least one of the DRX parameters.

10. The eNB of claim 8, wherein the eNB is further arranged to:
generate a new value for the DRX parameter; and
cause the UE to change the value for the DRX parameter among DRX parameters to the new value.

11. The eNB of claim 8, wherein the eNB is further arranged to:
generate at least one additional value for at least one additional DRX parameter among the DRX parameter based at least in part on the information associated with the application; and
send the at least one additional value to the UE.

12. The eNB of claim 8, wherein the eNB is arranged to operate in a long term evolution (LTE) network.

13. A method of operating user equipment (UE), the method comprising:
entering a discontinuous reception (DRX) mode using a two or more DRX parameters having values determined by an enhanced Node-B (eNB) based at least in part on information associated with an application running on the UE, the information including traffic pattern of packets associated with the application, the traffic pattern indicating whether the application generates background traffic packets and the information indicating delay requirements for the application, wherein the method includes staying in the DRX mode and refraining from entering radio resource control (RRC) idle state based on the traffic pattern of packets associated with the application, and wherein a value for an RRC inactivity timer for entering RRC idle state is greater than a periodicity of keep-alive messages associated with the application.

14. The method of claim 13, further comprising:
sending a message to the eNB, the message including at least one of the information associated with the application running on the UE, power level information of the UE, and a preferred value determined by the UE, wherein the message is sent to the eNB before entering the DRX mode.

15. The method of claim 14, further comprising:
receiving a message from the eNB, the message including the DRX parameter having the value determined by the eNB, wherein the value determined by the eNB is based further on at least one of the power level information of the UE and the preferred value determined by the UE.

16. The method of claim 13, further comprising:
changing the value for the DRX parameter.

* * * * *